(12) United States Patent
Sharma et al.

(10) Patent No.: US 12,505,654 B2
(45) Date of Patent: Dec. 23, 2025

(54) MATERIAL SELECTION FROM IMAGES

(71) Applicant: ADOBE INC., San Jose, CA (US)

(72) Inventors: Prafull Sharma, Cambridge, MA (US); Valentin Mathieu Deschaintre, London (GB); Michaël Yanis Gharbi, San Francisco, CA (US); Julien Olivier Victor Philip, London (GB)

(73) Assignee: ADOBE INC., San Jose, CA (US)

( * ) Notice: Subject to any disclaimer, the term of this patent is extended or adjusted under 35 U.S.C. 154(b) by 342 days.

(21) Appl. No.: 18/097,946

(22) Filed: Jan. 17, 2023

(65) Prior Publication Data

US 2024/0242483 A1 Jul. 18, 2024

(51) Int. Cl.
*G06V 10/774* (2022.01)
*G06V 10/74* (2022.01)

(52) U.S. Cl.
CPC .......... *G06V 10/774* (2022.01); *G06V 10/761* (2022.01)

(58) Field of Classification Search
CPC ..... G06V 10/774; G06V 10/761; G06V 10/82
See application file for complete search history.

(56) References Cited

U.S. PATENT DOCUMENTS

| | | | | |
|---|---|---|---|---|
| 6,463,168 B1* | 10/2002 | Alyassin | ................... | G06T 7/11 382/128 |
| 6,603,877 B1* | 8/2003 | Bishop | ............ | G01N 21/95607 382/165 |
| 7,760,927 B2* | 7/2010 | Gholap | .................. | G06V 20/69 382/133 |
| 9,905,394 B1* | 2/2018 | Bhattiprolu | ........... | H01J 37/265 |
| 2007/0003131 A1* | 1/2007 | Kaufman | ................ | G06T 19/20 382/128 |
| 2007/0229658 A1* | 10/2007 | Kanamori | ................ | G06T 3/40 348/207.99 |
| 2013/0101156 A1* | 4/2013 | Holt | ...................... | G01N 23/083 382/103 |
| 2015/0003706 A1* | 1/2015 | Eftestol | ..................... | G06T 7/11 382/131 |
| 2015/0219557 A1* | 8/2015 | Skaff | ....................... | B07C 5/342 702/189 |
| 2016/0371568 A1* | 12/2016 | Tin | .................... | G06F 18/24155 |
| 2018/0357514 A1* | 12/2018 | Zisimopoulos | ...... | G06V 10/764 |
| 2018/0374209 A1* | 12/2018 | Patil | ...................... | G06N 3/084 |
| 2019/0012768 A1* | 1/2019 | Tafazoli Bilandi | ....... | G06T 7/13 |
| 2019/0065899 A1* | 2/2019 | Movshovitz-Attias | ..................... | G06F 18/214 |
| 2019/0154597 A1* | 5/2019 | Zhang | .................. | G01N 15/088 |
| 2019/0347526 A1* | 11/2019 | Sunkavalli | ............. | G06N 3/084 |
| 2019/0370987 A1* | 12/2019 | Shi | ......................... | G06T 11/001 |
| 2020/0210768 A1* | 7/2020 | Turkelson | ............. | G06T 7/0002 |
| 2020/0294239 A1* | 9/2020 | Brada | ....................... | G06T 7/10 |

(Continued)

*Primary Examiner* — Aaron W Carter
(74) *Attorney, Agent, or Firm* — Shook, Hardy & Bacon L.L.P.

(57) ABSTRACT

A model is trained to predict pixels from an image that correspond to a material of a selected pixel using contrastive loss. A training dataset comprising a training image and material information for the training image is received. An anchor pixel in the training image is identified. To train the model using the training dataset, the model generates embeddings for pixels of the training image, including the anchor pixel and a plurality of other pixels. A contrastive loss is determined based on a comparison of the embeddings to the material information. The model is updated based on the loss.

20 Claims, 7 Drawing Sheets

(56) References Cited

U.S. PATENT DOCUMENTS

| | | | |
|---|---|---|---|
| 2020/0320723 A1* | 10/2020 | Lim | H04N 5/208 |
| 2020/0401843 A1* | 12/2020 | Peng | G06F 18/217 |
| 2020/0401854 A1* | 12/2020 | Peng | G06F 18/2148 |
| 2022/0156587 A1* | 5/2022 | Ebrahimpour | G06N 3/08 |
| 2022/0351379 A1* | 11/2022 | Lorsakul | G06T 7/0012 |
| 2022/0383127 A1* | 12/2022 | Altaf | G06N 3/09 |
| 2022/0414869 A1* | 12/2022 | Butler | G06T 7/11 |
| 2023/0062289 A1* | 3/2023 | Amma | G06V 10/82 |
| 2023/0081263 A1* | 3/2023 | Zhou | G06V 10/26 |
| | | | 382/103 |
| 2023/0281826 A1* | 9/2023 | Schulter | G06V 10/761 |
| | | | 382/173 |
| 2023/0281977 A1* | 9/2023 | Schulter | G06V 20/52 |
| | | | 348/180 |
| 2023/0290003 A1* | 9/2023 | Wen | G06T 7/74 |
| 2023/0290084 A1* | 9/2023 | Kurz | G06T 19/006 |
| 2024/0104797 A1* | 3/2024 | Gong | G06T 11/008 |
| 2024/0135543 A1* | 4/2024 | Liu | G06V 10/82 |
| 2024/0161362 A1* | 5/2024 | Deschaintre | G06T 11/60 |
| 2024/0242483 A1* | 7/2024 | Sharma | G06V 10/774 |
| 2024/0273134 A1* | 8/2024 | Yang | G06V 10/26 |
| 2024/0288308 A1* | 8/2024 | Tissera | G06V 10/143 |
| 2024/0290076 A1* | 8/2024 | Hosseinzadeh Taher | |
| | | | G06V 10/82 |
| 2024/0355580 A1* | 10/2024 | Yim | G06T 7/12 |
| 2024/0404244 A1* | 12/2024 | Deschaintre | G06V 10/54 |
| 2025/0005942 A1* | 1/2025 | Panetta | G06T 7/0012 |

* cited by examiner

MATERIAL SELECTION FROM IMAGES

BACKGROUND

Existing software programs provide tools for selecting objects from images. For example, Adobe Photoshop's "Object Selection" tool allows a user to draw an approximate boundary around an object in an image, based on which the program automatically selects an object located within the boundary. As another example, Adobe Photoshop's "Lasso Selection" tool allows a user to manually select a region (e.g., an object) in an image by drawing a boundary.

SUMMARY

Some aspects of the present technology relate to, among other things, material selection from images using a material selection model trained using a contrastive loss. In accordance with some aspects, the material selection model is trained using a training dataset comprising training images and corresponding material information over one or more iterations. At each iteration, an anchor pixel corresponding to a first material is identified. A first plurality of pixels in a training image corresponding to the first material and a second plurality of pixels corresponding to a second material are further identified. Embeddings are generated by the material selection model for the anchor pixel, the first plurality of pixels, and the second plurality of pixels. The contrastive loss is computed using the embeddings, and the material selection model is updated based on the contrastive loss.

Further aspects include receiving an input image and a selection of a target pixel in the input image. A plurality of embeddings is generated using a material selection model trained on a training dataset comprising a training image and material information for the training image. The plurality of embeddings includes a target embedding for the target pixel and an embedding for each of a plurality of other pixels in the input image. Based on the target embedding and the embedding for each of the plurality of other pixels, a subset of pixels in the input image corresponding to a material of the target pixel is identified.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Overview

Identifying a material (e.g., wood) from a static image is a challenging task for computer vision systems. The appearance of a given material in an image depends not just on the composition of the material, but on numerous additional variables, such as the geometry of the object being viewed, the intensity and position of the light source(s), and camera settings. The difficulty of this task is further increased by the sheer size of the number of different materials present in images and the relative scarcity of labeled data (e.g., real-world images labeled according to the materials represented by the images' pixels) for training machine learning models.

For some applications, however, it is not necessary to identify the particular material from which an object is formed. For example, an interior designer may wish to visualize what a room would look like if all wood was replaced with stainless steel. In order to alter a digital image of the room in this manner, it is unnecessary for a computer vision system to identify the to-be-replaced material as "wood"-a task conventional systems struggle to perform accurately for the reasons previously discussed.

Existing object selection tools also fail at this task. For example, if different portions of an object are made of different materials, an object selection tool may be unable to select only a portion of the object corresponding to a particular material. As another example, if an object is obscured or segmented by another object (e.g., portions of a house are hidden behind a fence), an object selection tool may struggle to automatically select all pixels corresponding to the house. Moreover, such tools cannot automatically select all objects corresponding to a same material across an entire image.

Aspects of the technology described herein train a material selection model to identify pixels in an image that correspond to a material selected from the image—i.e., in a manner agnostic to the identity of the selected material. This approach bypasses the difficult step of identifying the selected material, improving accuracy and increasing the ease with which a material selection model can be trained. For example, according to some aspects described herein, a target pixel is selected (or multiple target pixels are selected) in an input image. In some configurations, the target pixel(s) is user-selected and corresponds to a material the user wishes to select. A material selection model generates embeddings, including a target embedding for the target pixel(s) and an embedding for each of a number of other pixels in the input image. Based on the target embedding and the embedding for each of the other pixels, a subset of pixels in the input image corresponding to a material of the target pixel is identified. In some aspects, an output image comprising a visual indication of the subset of pixels is produced and provided for presentation. In other words, pixels corresponding to the selected material (i.e., corresponding to the anchor pixel(s)) can be visually indicated in the output image.

The material selection model is trained using training images and material information (e.g., a ground-truth pixel-wise material map) identifying materials in each training image. During training, using a given training image, an anchor pixel is selected and a material of the anchor pixel is identified using the material information for the training image. Additionally, using the material information, pixels in the training image having the same material as the anchor pixel (i.e., positive samples) and pixels in the training image having a different material (i.e., negative samples) are identified. The material selection model generates embeddings for the anchor pixel, each positive example pixel, and each negative example pixel. A contrastive loss is determined based on the embeddings, and the material selection model is updated (e.g., using backpropagation) based on the contrastive loss. The process can be iterated over a number of training images to provide a trained material selection model. Once trained, the material selection model is used to predict which pixels in an input image correspond to a material selected from the input image.

With respect to training the material selection model, one challenge is the identification of a suitable set of training images. In some aspects, the material selection model is trained on real-world photographs. However, this approach could require manual, pixel-by-pixel labeling of each training image. Because training the material selection model on a large set of training images can produce more accurate predictions, the manual labeling process can be prohibitively time consuming. Thus, in some aspects, the present disclosure describes procedurally generating training images. A procedural generation model can, for example, populate an environment with objects comprising the same and/or different materials and produce per-pixel material information corresponding to the objects. Any of several techniques can be used to maximize the extent to which the procedurally generated training images enable the material selection model to generalize to real-world photographs, such as adding multiple light sources, image compression, white balance adjustment, and more. Accordingly, a large volume of labeled training images can be produced in an automated, time-efficient manner, enhancing the training process and aiding the material selection model in making more accurate predictions.

Aspects of the technology described herein provide a number of improvements over existing technologies. For instance, some existing technologies attempt to predict materials to which selected pixels correspond (e.g., given user-selected pixels, an existing technology predicts that the pixels correspond to "wood"). However, as previously discussed, these technologies' predictions are generally unreliable due to, for example, the number of variables that affect a given material's appearance in a given image. Other existing technologies, such as object selection tools, are not capable of automatically selecting multiple objects in an image that correspond to a single material. In some aspects, the technology described herein improves upon these existing technologies by training a material selection model (e.g., on synthetic, pre-labeled data) to select pixels corresponding to a user-selected material—e.g., in a manner agnostic to the identity of the user-selected material. This approach can improve accuracy of material selection and training speed. Moreover, in some aspects, the technology described herein automatically selects, from an image, multiple (or all) objects corresponding to a same material, improving the speed and efficiency with which images can be edited. These aspects improve upon conventional methods related to image editing and machine vision, for example.

Example System for Material Selection

Figure 1:
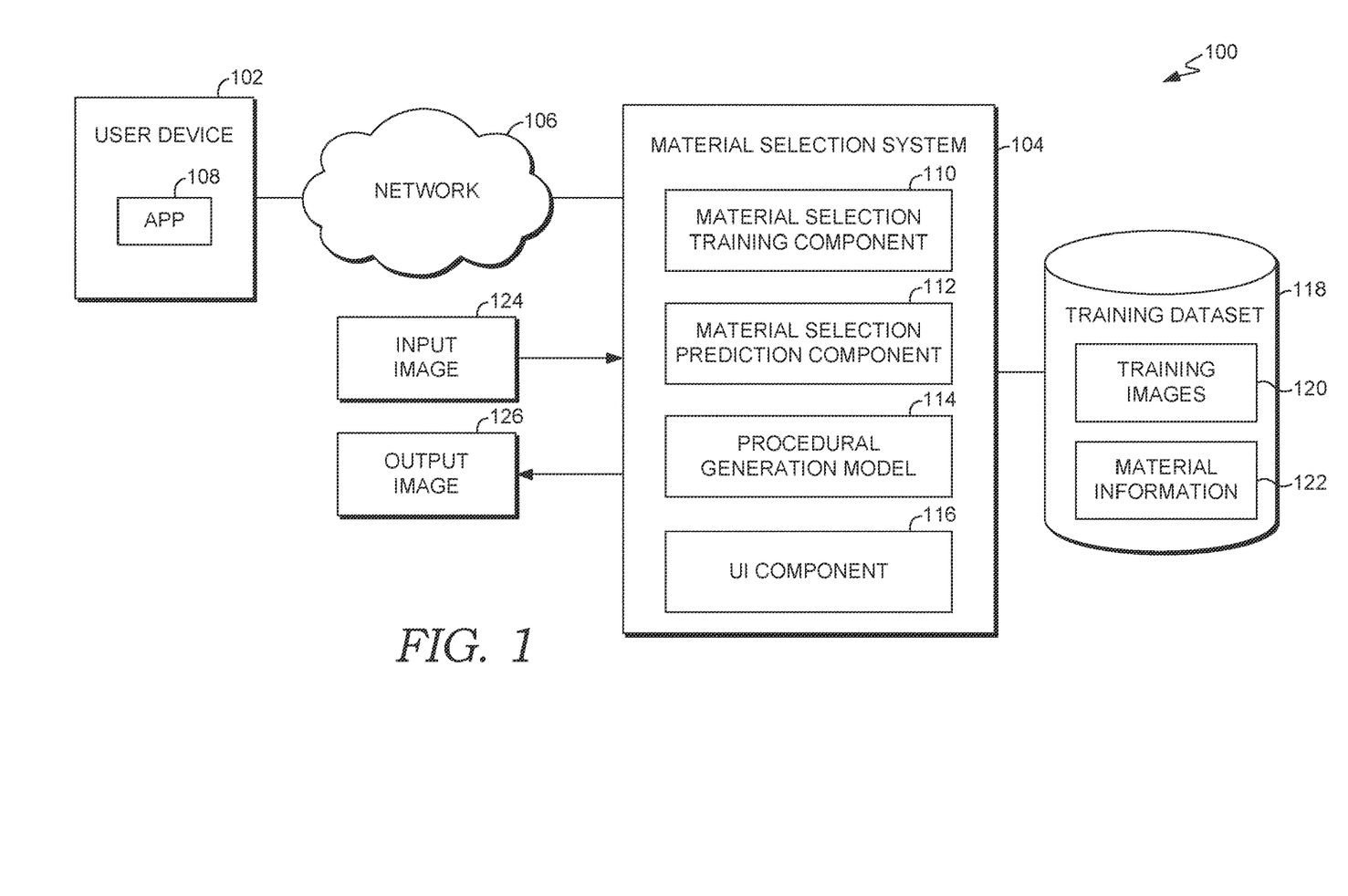
FIG. 1 is a block diagram illustrating an exemplary system in accordance with some implementations of the present disclosure.

With reference now to the drawings, FIG. 1 is a block diagram illustrating an exemplary system 100 for material selection from images in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. Among other components not shown, the system 100 includes a user device 102 and a material selection system 104. Each of the user device 102 and material selection system 104 shown in FIG. 1 can comprise one or more computer devices, such as the computing device 700 of FIG. 7, discussed below. As shown in FIG. 1, the user device 102 and the material selection system 104 can communicate via a network 106, which can include, without limitation, one or more local area networks (LANs) and/or wide area networks (WANs). Such networking environments are commonplace in offices, enterprise-wide computer networks, intranets, and the Internet. It should be understood that any number of client devices and server devices can be employed within the system 100 within the scope of the present technology. Each can comprise a single device or multiple devices cooperating in a distributed environment. For instance, the material selection system 104 can be provided by multiple server devices collectively providing the functionality of the material selection system 104 as described herein. Additionally, other components not shown can also be included within the network environment.

The user device 102 can be a client device on the client side of operating environment 100, while the material selection system 104 can be on the server side of operating environment 100. The material selection system 104 can comprise server-side software designed to work in conjunction with client-side software on the user device 102 so as to implement any combination of the features and functionalities discussed in the present disclosure. For instance, the user device 102 can include an application 108 for interacting with the material selection system 104. The application 108 can be, for instance, a web browser or a dedicated application for providing functions, such as those described herein. This division of operating environment 100 is provided to illustrate one example of a suitable environment, and there is no requirement for each implementation that any combination of the user device 102 and the material selection system 104 remain as separate entities. While the operating environment 100 illustrates a configuration in a networked environment with a separate user device and material selection system, it should be understood that other configurations can be employed in which components are combined. For instance, in some configurations, a user device can also provide capabilities of the technology described herein.

The user device 102 can comprise any type of computing device capable of use by a user. For example, in one aspect, the user device can be the type of computing device 700 described in relation to FIG. 7 herein. By way of example and not limitation, the user device 102 can be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device. A user can be associated with the user device 102 and can interact with the material selection system 104 via the user device 102.

At a high level, the material selection system 104 trains one or more material selection models that perform material selections for images. For instance, given an input image, such as the input image 124, and a selected pixel (or group of pixels) the material selection system 104 generates an output image, such as the output image 126, that identifies other pixels in the image with a same material as the selected pixel(s). In accordance with aspects of the technology described herein, a material selection model is trained to generate pixel embeddings for pixels of the input image 124 based on a contrastive loss.

As shown in FIG. 1, the material selection system 104 includes a material selection training component 110, a material selection prediction component 112, a procedural generation model 114, and a user interface component 116. The components of the material selection system 104 can be in addition to other components that provide further additional functions beyond the features described herein. The material selection system 104 can be implemented using one or more server devices, one or more platforms with corresponding application programming interfaces, cloud infrastructure, and the like. While the material selection system 104 is shown separate from the user device 102 in the configuration of FIG. 1, it should be understood that in other configurations, some or all of the functions of the material selection system 104 can be provided on the user device 102.

In one aspect, the functions performed by components of the material selection system 104 are associated with one or more applications, services, or routines. In particular, such applications, services, or routines can operate on one or more user devices or servers, be distributed across one or more user devices and servers, or be implemented in the cloud. Moreover, in some aspects, these components of the material selection system 104 can be distributed across a network, including one or more servers and client devices, in the cloud, and/or can reside on a user device. Moreover, these components, functions performed by these components, or services carried out by these components can be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, although functionality is described herein with regards to specific components shown in example system 100, it is contemplated that in some aspects, functionality of these components can be shared or distributed across other components.

Training Dataset

The material selection training component 110 of the material selection system 104 trains a material selection model to generate, from input images, pixel embeddings that facilitate identifying pixels in the input images matching the materials of selected pixels. In some aspects, the material selection model comprises a neural network, such as a convolutional neural network or transformer. When trained, the material selection model predicts (e.g., by generating pixel embeddings) which pixels in the input image correspond to a material associated with a target pixel.

The material selection training component 110 receives a training dataset 118 which is used to train the material selection model. The training dataset 118 includes training images 120 and material information 122 identifying materials in the training images.

In some aspects, at least some of the training images 120 comprise real-world photographs, other organic or artificial data, and/or a combination thereof. In some instances, the material information comprises manually-generated labels identifying materials in training images. In other instances, the material information comprises automatically-generated labels (e.g., using a model that analyzes the training images to detect materials in the training images).

Figure 2:
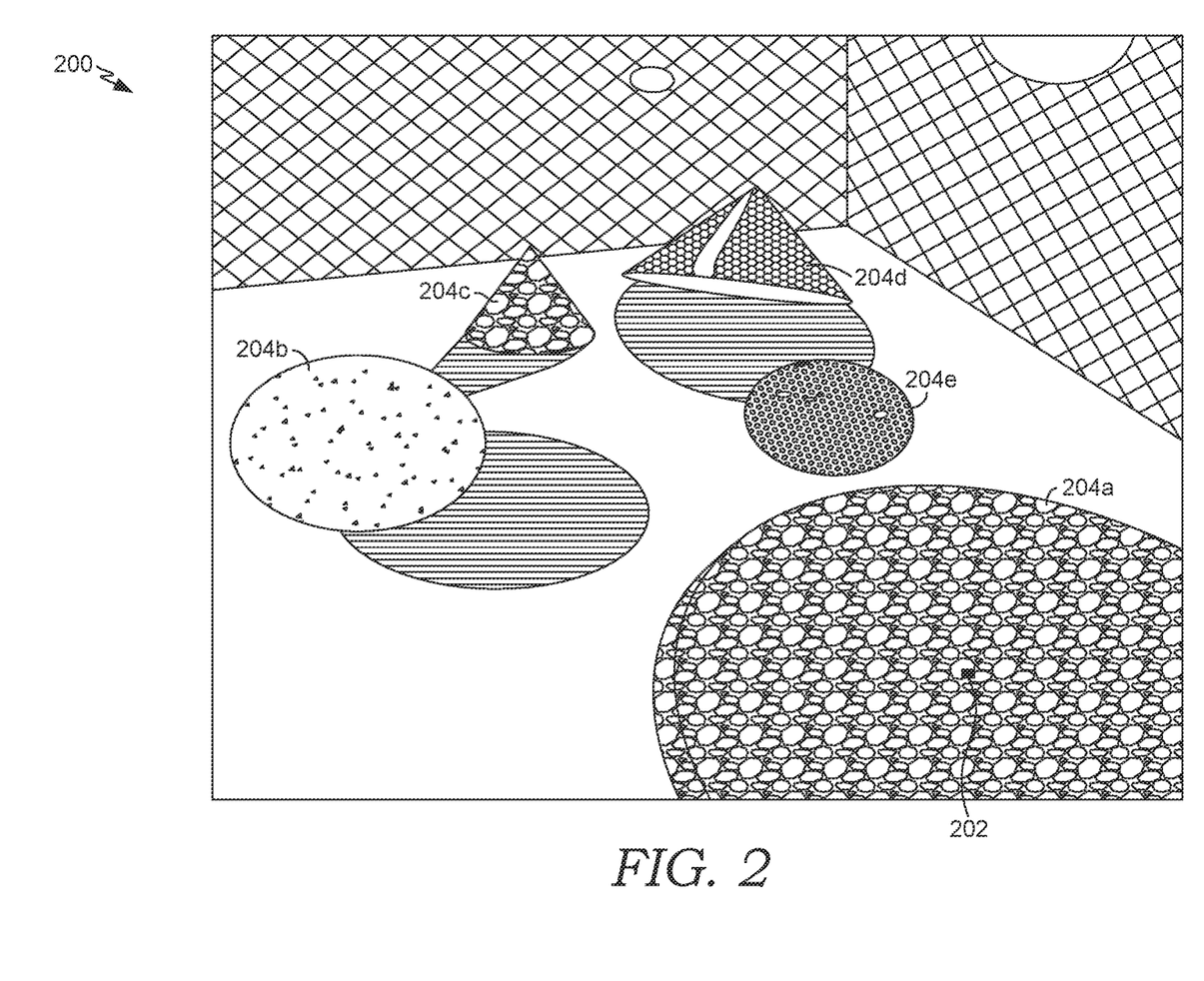
FIG. 2 is an exemplary training image in accordance with some implementations of the present disclosure.

In some aspects, one or more of the training images 120 are procedurally generated—e.g., using a procedural generation model 114. The procedural generation model 114 can utilize a software program (e.g., Blender) that is capable of simulating a three-dimensional environment and/or rendering a two-dimensional image accordingly. As shown in FIG. 2, which represents an exemplary training image 200, the procedural generation model 114 can populate an environment (which can subsequently be rendered as a training image) with objects (e.g., 204a-e), surfaces, and/or light sources, for example. Some or all objects can comprise materials, which can also be procedurally generated (e.g., using Substance 3D). Moreover, the procedural generation model 114 can assign different materials to different objects. For example, the procedural generation model 114 can generate a training image that comprises a first object assigned (e.g., comprising) a first material and a second object assigned (e.g., comprising) a second material. In some cases, a single object can comprise multiple materials. For example, an object can comprise a mixture or blend of materials and/or multiple regions comprising different materials.

Referring again to FIG. 2, objects (e.g., 204a-e) produced by the procedural generation model 114 can be or comprise procedurally generated shapes (e.g., geometric primitives). For example, the objects can be, without limitation, cubes, cones, cylinders, spheres, and/or tori. Although the exemplary training image 200 shown in FIG. 2 only comprises objects that are geometric primitives, this is merely an example. In some embodiments, the objects can be or comprise other shapes, real-world objects, and/or representations of real-world objects. Parameters that define an object's dimensions can be randomized within predetermined ranges. The predetermined ranges can be configured to ensure the training image's usefulness in training the material selection model—e.g., by preventing an object from being too small to provide utility in the training process and/or preventing an object from being so large that it dominates the image, obscuring other objects. Moreover, other parameters associated with the object (e.g., that define the object's rotation, orientation, location, etc.) can be randomized. A training image can contain, for example, between five and fifteen objects, inclusive. However, it is contemplated that a training image can contain fewer (i.e., one to four) or more (i.e., more than fifteen) objects in some cases.

In some aspects, the procedural generation model 114 lights the environment with one or more light sources—e.g., one to five light sources, inclusive. The light sources can be positioned outside of the environment (as shown in FIG. 2) and/or can be positioned inside the environment. A light source can be, for example, an area lamp. The intensity of a light source can be randomized from a predetermined range—e.g., about 200 watts to about 600 watts. (As used herein, the word "about" means ±10% of the indicated value.) The position(s) of the light source(s) can also be randomized.

Once the environment is populated, the procedural generation model 114 can render the environment as an image—e.g., a two-dimensional image. In order to improve the material selection model's ability to generalize to real-world photographs, the procedural generation model 114 can additionally apply random white balance, exposure correction, gamma correction, image compression, vertical reflections, horizontal reflections, vertical crops, and/or horizontal crops. The extent or intensity of these randomized effects can be constrained by preselected ranges, which can be selected in order to prevent the image from becoming so distorted that the image provides little or no value in the training process. Once rendered (and processed or altered, if desired) by the procedural generation model 114, a training image can be stored in the training dataset 118.

Returning to FIG. 1, the training dataset 118 also comprises material information 122. At a high level, the material information 122 comprises information regarding material(s) to which pixels of some or all of the training images 120 correspond. For example, the material information 122 can be ground-truth information regarding materials in the training images 120. In some cases, the material information 122 can comprise a per-pixel material map for a training image; however, in the same or other embodiments, the material information 122 can comprise a lower information density—e.g., not include material information per pixel of one or more of the training images 120. In some aspects (e.g., when training images are photographs), the material information 122 is manually generated or automatically generated (e.g., by a semantic material classifier). In some aspects, the material information 122 is produced by or from the procedural generation model 114. The material information 122 is stored in the training dataset 118.

In some cases, the material information 122 comprises labels for pixels—e.g., pixels of the training images 120. For example, the material information 122 can comprise pixel labels for pixels of one or more objects in one or more training images 120. The pixel labels for pixels of an object can identify a material—e.g., a material assigned to the object by the procedural generation model 114. However, in some cases, the pixel labels do not identify the particular material (e.g., wood) to which a pixel corresponds, but rather, comprise information that allows for the identification of other pixel(s) in the training image that correspond to the same material. For example, instead of labeling pixels with materials, such as "wood" and "metal," generic labels such as "a" and "b" could be used. The material information 122 can also comprise pixel labels for portions of training images that do not correspond to objects (e.g., surfaces, such as walls).

Training the Material Selection Model

Given a training dataset (e.g., 118), the material selection training component 110 trains the material selection model over any number of iterations. At a high level, in some aspects, iterations include identifying an anchor pixel; identifying a first plurality of pixels in the training image corresponding to a material of the anchor pixel (i.e., positive samples); identifying a second plurality of pixels corresponding to a different material (i.e., negative samples); generating, using the material selection model, embeddings for the anchor pixel, the positive sample pixels, and of the negative sample pixels; computing a contrastive loss using the embeddings; and updating the material selection model based on the contrastive loss. These steps are discussed in more detail below.

Given a training image (e.g., of the training images 120), the material selection training component 110 selects an anchor pixel (e.g., the anchor pixel 202 in FIG. 2). The anchor pixel can be randomly selected from an object in the training image. In other cases, the anchor pixel can be randomly selected from the entire training image (i.e., the anchor pixel does not correspond to an object in the training image). Additionally, although referred to as an anchor pixel, the anchor pixel can be a plurality of pixels—e.g., a plurality of contiguous pixels. The material selection training component 110 identifies a material of the anchor pixel based on the material information 122 for the training image.

The material selection training component 110 identifies, based on the material information 122 for the training image, a first plurality of pixels in the training image corresponding to the material of the anchor pixel (i.e., positive samples) and a second plurality of pixels in the training image corresponding to a different material (i.e., negative samples). Put another way, the material selection training component 110 can query the material information 122 to determine other pixels in the training image that correspond to—and/or do not correspond to—the material to which the anchor pixel corresponds.

In some aspects, the material selection training component 110 trains the material selection model to generate pixel embeddings using a contrastive loss based on the anchor pixel, the first plurality of pixels, and the second plurality of pixels. The material selection model generates an embedding for the anchor pixel, each pixel of the first plurality of pixels, and each pixel of the second plurality of pixels.

Once the material selection model has generated the embeddings, the material selection training component 110 computes a contrastive loss for the embeddings. The contrastive loss can be calculated as follows:

$$\text{Loss}_{Contrastive}(x_i) = -\log \frac{\sum_{x_j \in P} e^{sim(x_i, x_j)/\tau}}{\sum_{x_j \in P} e^{sim(x_i, x_j)/\tau} + \sum_{x_j \in N} e^{sim(x_i, x_j)/\tau}},$$

$$\text{where } sim(x_i, x_j) = \frac{x_i \cdot x_j}{\max(\|x_i\|\|x_j\|, \epsilon)},$$

$\tau$ is a temperature that controls the sharpness of the affinity (e.g., controls the extent to which hard negative samples are penalized), $x_i$ is the embedding for the ith pixel, $x_j$ is the embedding for the jth pixel, P is the number of pixels in the first plurality of pixels (e.g., pixels corresponding to the material of the anchor pixel), and N is the number of pixels in the second plurality of pixels (e.g., pixels not corresponding to the material of the anchor pixel).

The material selection training component 110 updates the material selection model based on the contrastive loss—e.g., using backpropagation. This process can be repeated over any number of iterations and/or training images.

Material Selection Prediction

After training, the material selection model is used by the material selection prediction component 112 to predict which pixels in an input image correspond to a material of a selected pixel (or selected group of pixels) from the input image. At a high level, in some aspects, an input image is received, a selection of a target pixel in the input image is received, the material selection model generates a plurality of embeddings (i.e., embeddings for the target pixel and other pixels in the input image), a subset of pixels in the input image corresponding to a material of the target pixel are identified based on the plurality of embeddings, and an output image containing a visual indication of the subset of pixels is displayed. These steps are discussed in more detail below.

Figure 3:
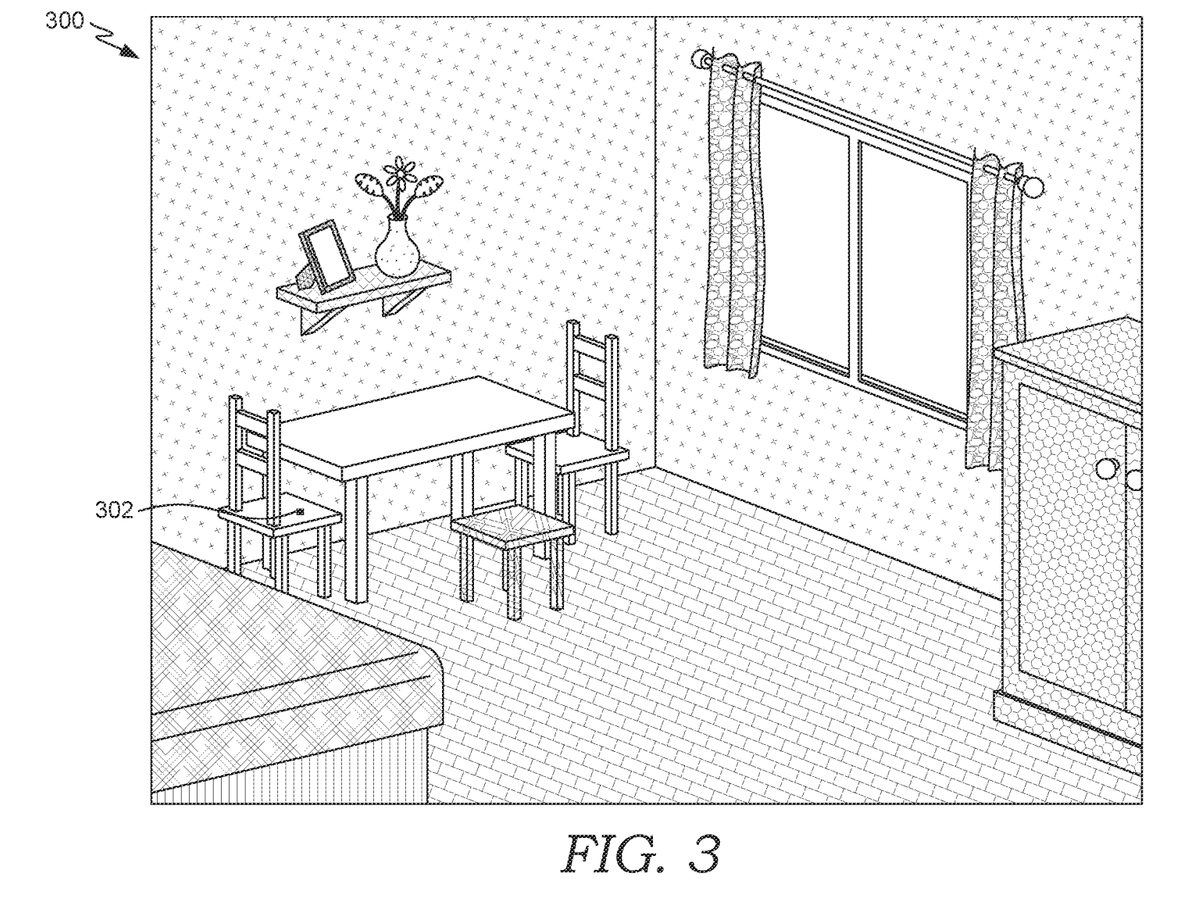
FIG. 3 is an exemplary input image in accordance with some implementations of the present disclosure.

The material selection prediction component 112 receives an input image (e.g., input image 124). An exemplary input image 300 is shown in FIG. 3. The input image can be received from a user device (e.g., user device 102) and can be received over a network (e.g., network 106). The input image can be an RGB image, for example, and can comprise any format or file type.

The material selection prediction component 112 receives a selection of a target pixel (e.g., target pixel 302 in the input image 300 of FIG. 3). The target pixel 302 can be received, for instance, from a user device (e.g., user device 102) and can be received over a network (e.g., network 106). In some cases, the target pixel 302 corresponds to a material a user wishes to select. Although referred to herein as a target pixel, the target pixel 302 can be a plurality of pixels—e.g., a plurality of contiguous pixels. After receiving the selection of the target pixel 302, the material selection prediction component 112 can cause a visual indication of the target pixel to be displayed—e.g., on the user device 102.

Given the input image 300 and target pixel 302, the material selection model generates a plurality of embeddings for pixels of the input image 300. The plurality of embeddings includes a target embedding for the target pixel 302 and an embedding for each of a plurality of other pixels in the input image 300. The plurality of other pixels can include some or all pixels in the input image 300 (excluding the target pixel 302). A separate embedding can be generated for each pixel of the plurality of other pixels.

Based on the target embedding and the embedding for each of the plurality of other pixels in the input image, the material selection prediction component 112 identifies a subset of pixels in the input image 300 corresponding to a material of the target pixel 302. The identification of the subset of pixels can be based on computing a distance (e.g., a cosine distance) between the target embedding and the embedding for each of the plurality of other pixels in the input image.

In some aspects, the material selection prediction component 112 compares the computed distances to a threshold. The threshold can represent how close (e.g., how small) a distance between the target embedding and another pixel embedding (e.g., for a pixel of the plurality of other pixels) must be in order for the material selection prediction component 112 to predict that the pixel comprises a material corresponding to the material of the target pixel 302. The threshold can be determined, raised, or lowered—e.g., by a user at the user device 102. The material selection prediction component 112 can, for example, determine that the distance for each pixel from a subset of pixels (e.g., of the plurality of other pixels) in the input image is below the threshold.

Figure 4:
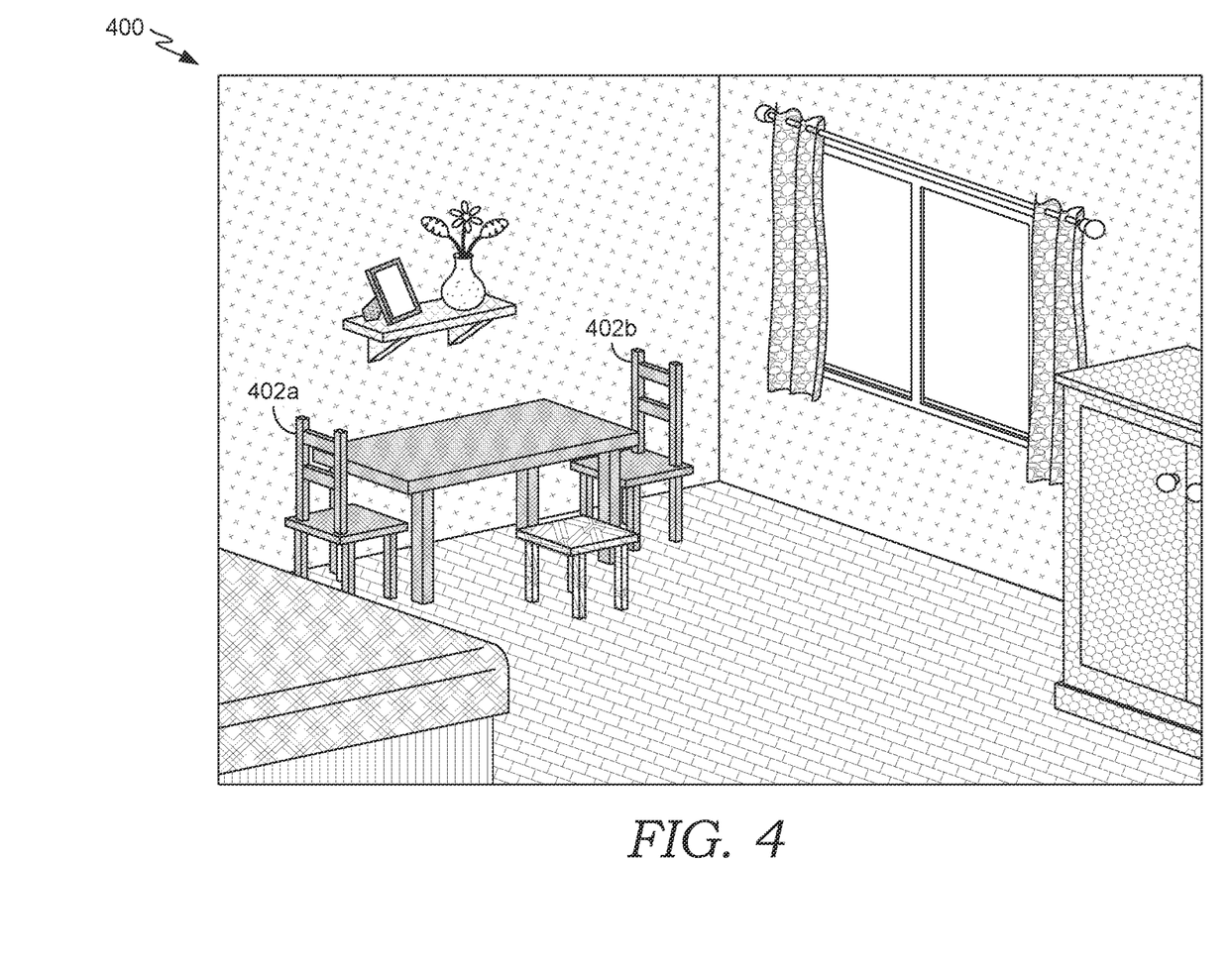
FIG. 4 is an exemplary output image in accordance with some implementations of the present disclosure.

Based on the determination, the material selection prediction component 112 can cause presentation of an output image (e.g., output image 126). The output image 126 can be presented at the user device 102. In some cases, and as shown in FIG. 4, the output image 400 can comprise a visual indication of the subset of pixels. In the example of FIGS. 3-4, the target pixel 302 in the input image 300 corresponds to a chair 402a made of wood, so in the output image 400, the chair 402a is visually indicated (i.e., shaded or selected), as are other surfaces made of wood (e.g., the other chair 402b and the wooden table 404 between the chairs).

If the threshold is raised or lowered (e.g., by a user at the user device 102), the subset of pixels and/or the visual indication of the subset of pixels in the output image 400 can be modified accordingly. For example, if the threshold is altered (e.g., raised) to decrease the number of pixels in the subset of pixels (e.g., to reduce false positives), the material selection prediction component 112 can identify and provide a second subset of pixels. The second subset of pixels can be a subset of the subset of pixels. In other examples, if the threshold is altered (e.g., lowered), the material selection prediction component 112 can identify and provide a third subset of pixels. The third subset of pixels can comprise each pixel in the subset of pixels and additional pixels of the input image 300. In either case, the material selection prediction component 112 can update the output image to include a visual indication of the second subset of pixels (or third subset of pixels) and cause presentation of the updated output image.

Returning to FIG. 1, the user interface component 116 of the material selection system 104 provides one or more user interfaces for interacting with the material selection system 104. For instance, the user interface component 116 can provide user interfaces to a user device, such as the user device 102, that are presented on the user device 102 using the application 108. Among other things, the user interfaces provided by the user interface component 116 can enable a user to interact with the material selection system 104 for training purposes (e.g., configuring aspects of the training, etc.) and/or inference purposes (e.g., providing input images, receiving output images, changing the threshold, etc.).

EXAMPLE METHODS

Figure 5:
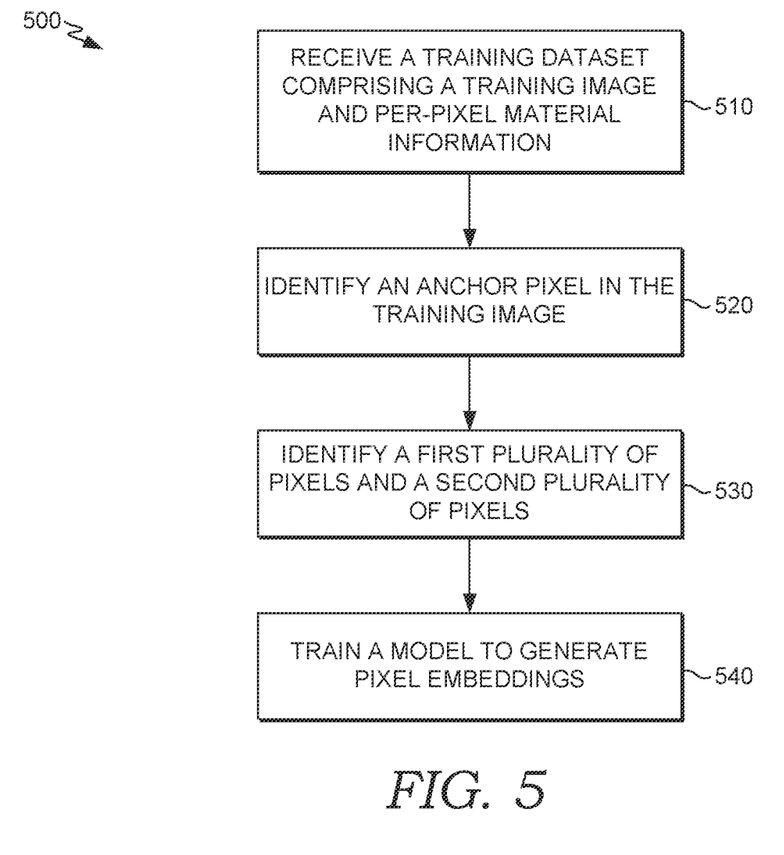
FIG. 5 is a flow diagram showing a method for training a material selection model to generate pixel embeddings in accordance with some implementations of the present disclosure.

With reference now to FIG. 5, a flow diagram is provided that illustrates a method 500 for training a material selection model. The method 500 can be performed, for instance, by the material selection training component 110 of FIG. 1. Each block of the method 500 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few examples.

As shown at block 510, a training dataset is received. The training dataset includes a training image and material information. The training image can comprise any of the properties of any of the training images 120 and/or the training image 200. For example, the training image can be a photograph or procedurally generated using any of the approaches previously described with respect to the training images 120 and/or 200. The material information corresponds to the training image, providing ground-truth information regarding materials at locations (e.g., pixels) of the training image.

The training process can be iteratively performed over a number of training images. As such, the process of blocks 520 through 540 can be performed for each of a number of training images. At block 520, an anchor pixel in the training image is identified. The anchor pixel can be randomly selected from the training image (e.g., from an object or surface in the training image). The anchor pixel can be a single pixel or a plurality of pixels (e.g., a plurality of contiguous pixels). The anchor pixel corresponds to a first material based on the material information for the training image.

At block 530, a first plurality of pixels and a second plurality of pixels in the training image are identified. The first plurality of pixels are pixels in the training image that correspond to the material of the anchor pixel (i.e., positive samples). The second plurality of pixels are pixels in the training image that do not correspond to the material of the anchor pixel (e.g., correspond to a different material) (i.e., negative samples). The first and second pluralities of pixels are identified based on the material information for the training image.

At block 540, a material selection model is trained to generate pixel embeddings. The training can, for example, utilize a contrastive loss function based on the anchor pixel, the first plurality of pixels, and the second plurality of pixels. Specifically, the material selection model can generate embeddings for the anchor pixel, the first plurality of pixels, and the second plurality of pixels. A contrastive loss can be computed using the embeddings, and the contrastive loss can be used to update the material selection model (e.g., via backpropagation).

Figure 6:
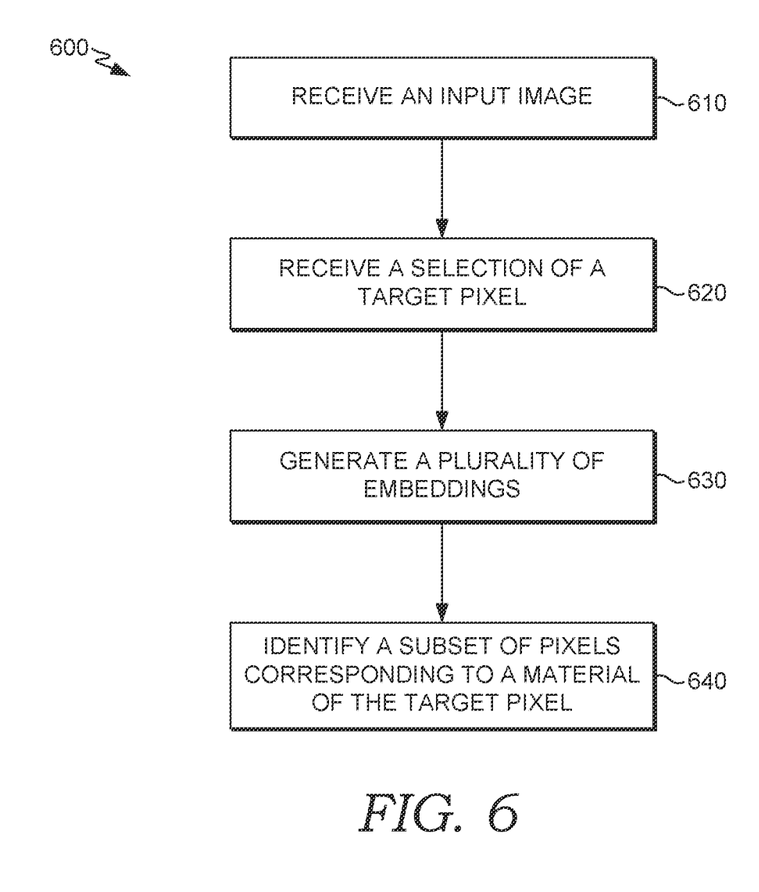
FIG. 6 is a flow diagram showing a method for identifying pixels corresponding to a material of a target pixel in accordance with some implementations of the present disclosure.

Turning to FIG. 6, a flow diagram showing a method 600 for identifying pixels corresponding to a material of a target pixel is provided. The method 600 can be performed, for instance, by the material selection prediction component 112 of FIG. 1. As shown at block 610, an input image is received. The input image can be received from a user device (e.g., the user device 102 of FIG. 1), for example. At block 620, a selection of a target pixel is received. The target pixel can be received from a user device (e.g., the user device 102 of FIG. 1), for example. At block 630, a plurality of embeddings is generated. The embeddings can be generated by a trained material selection model (e.g., trained in accordance with the method 500). The plurality of embeddings can include a target embedding for the target pixel and/or an embedding for each of a plurality of other pixels in the input image. At block 640, a subset of pixels corresponding to a material of the target pixel is identified. The subset of pixels can be identified based on a comparison between the target embedding and the embedding of each other pixel. In some instances, a pixel is identified based on the comparison of the target embedding and the embedding for that pixel satisfying a threshold (e.g., a threshold distance). In some aspects, an output image comprising a visual indication of the subset of pixels is provided for presentation.

Exemplary Operating Environment

Figure 7:
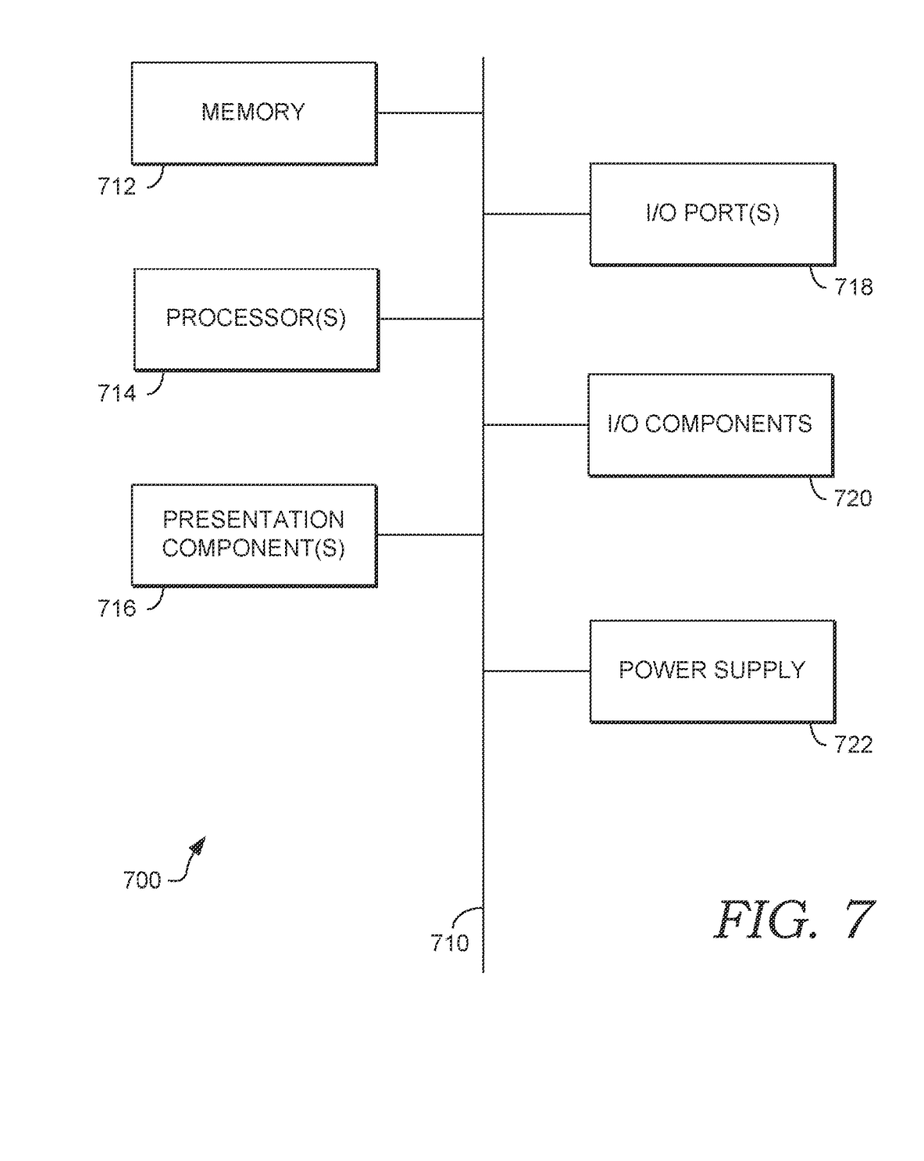
FIG. 7 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring to FIG. 7, an exemplary operating environment for implementing embodiments of the present technology is shown and designated generally as computing device 700. Computing device 700 is but one example of a suitable computing environment and is not intended to suggest any limitation as to the scope of use or functionality of the technology. Neither should the computing device 700 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what can be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 7 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory can be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which can be built in. Illustrative components include a microphone, joystick, game pad, satellite dish, scanner, printer, wireless device, etc. The I/O components 720 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 700. The computing device 700 can be equipped with depth cameras, such as, stereoscopic camera systems, infrared camera systems, RGB camera systems, and combinations of these for gesture detection and recognition. Additionally, the computing device 700 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. One or more computer storage media storing computer-useable instructions that, when used by a computing device, cause the computing device to perform operations, the operations comprising:
   receiving a training dataset comprising a training image and per-pixel material information for the training image;

identifying an anchor pixel in the training image, the anchor pixel corresponding to a first material based on the per-pixel material information;

identifying, based on the per-pixel material information, a first plurality of pixels in the training image corresponding to the first material and a second plurality of pixels in the training image corresponding to remaining pixels in the training image that correspond to materials different from the first material; and training a model to generate pixel embeddings that facilitate identifying pixels matching a selected material agnostic to an identity of the selected material using contrastive loss based on the anchor pixel, the first plurality of pixels, and the second plurality of pixels.

2. The one or more computer storage media of claim 1, wherein the training image comprises a first object comprising the first material and a second object comprising a second material.

3. The one or more computer storage media of claim 2, wherein the per-pixel material information comprises pixel labels for corresponding pixels of the first object and other corresponding pixels of the second object, the pixel labels for the corresponding pixels of the first object identifying the first material and the pixel labels for the other corresponding pixels of the second object identifying the second material.

4. The one or more computer storage media of claim 2, wherein the training image is generated using a procedural generation model.

5. The one or more computer storage media of claim 4, wherein the first object is assigned the first material and the second object is assigned the second material by the procedural generation model.

6. The one or more computer storage media of claim 5, wherein the training image is augmented by applying one or more selected from: white balance adjustment, exposure correction, gamma correction, and JPEG compression.

7. The one or more computer storage media of claim 1, wherein training the model comprises:

generating, by the model, an embedding for the anchor pixel, each pixel from the first plurality of pixels, and each pixel from the second plurality of pixels;

computing the contrastive loss using the embedding for the anchor pixel, each pixel from the first plurality of pixels, and each pixel from the second plurality of pixels; and updating the model based on the contrastive loss.

8. The one or more computer storage media of claim 1, wherein the operations further comprise:

receiving an input image;

receiving a selection of a target pixel in the input image;

generating, using the model, a plurality of embeddings including a target embedding for the target pixel and an embedding for each of a plurality of other pixels in the input image; and identifying a subset of pixels in the input image corresponding to a material of the target pixel based on the plurality of embeddings.

9. A computer-implemented method comprising:

receiving an input image;

receiving a selection of a target pixel in the input image;

generating, using a model trained on a training dataset comprising a training image and material information for the training image, a plurality of embeddings that facilitate identifying pixels matching a selected material agnostic to an identity of the selected material, the plurality of embeddings including a target embedding for the target pixel and an embedding for each of a plurality of other pixels in the input image; and identifying a subset of pixels in the input image corresponding to a material of the target pixel based on the target embedding and the embedding for each of the plurality of other pixels.

10. The computer-implemented method of claim 9, further comprising:

causing presentation of an output image, the output image comprising the input image with a visual indication of the subset of pixels.

11. The computer-implemented method of claim 9, wherein identifying the subset of pixels comprises:

computing a cosine distance between the target embedding and the embedding for each of the plurality of other pixels in the input image; and determining the cosine distance for each pixel from the subset of pixels is below a threshold.

12. The computer-implemented method of claim 11, wherein the threshold is user-configurable.

13. The computer-implemented method of claim 9, wherein the training image comprises a first object comprising a first material and a second object comprising a second material.

14. The computer-implemented method of claim 13, wherein the material information comprises pixel labels for corresponding pixels of the first object and other corresponding pixels of the second object, the pixel labels for the corresponding pixels of the first object identifying the first material and the pixel labels for the other corresponding pixels of the second object identifying the second material.

15. The computer-implemented method of claim 14, wherein the training image is generated using a procedural generation model.

16. A computer system comprising:

one or more processors; and one or more computer storage media storing computer-useable instructions that, when used by the one or more processors, causes the one or more processors to perform operations comprising:

providing an input image;

providing a selection of a target pixel in the input image; and receiving an output image, the output image comprising the input image with a visual indication of a subset of pixels, wherein the subset of pixels is determined based on a plurality of embeddings that facilitate identifying pixels matching a selected material agnostic to an identity of the selected material, the plurality of embeddings including a target embedding for the target pixel and an embedding for each of a plurality of other pixels in the input image, and wherein the plurality of embeddings are determined by a model trained on a training dataset comprising a training image and per-pixel material information for the training image.

17. The computer system of claim 16, wherein the subset of pixels is identified by:

computing a cosine distance between the target embedding and the embedding for each of the plurality of other pixels in the input image; and determining the cosine distance for each pixel from the subset of pixels is below a threshold.

18. The computer system of claim 17, wherein the operations further comprise:

providing a second threshold that is different than the threshold; and receiving a second subset of pixels, wherein the second subset of pixels is a subset of the subset of pixels, and wherein the second subset of pixels is identified based on the second threshold.

19. The computer system of claim 16, wherein the training image comprises a first object comprising a first material and a second object comprising a second material, and wherein the per-pixel material information comprises pixel labels for corresponding pixels of the first object and other corresponding pixels of the second object, the pixel labels for the corresponding pixels of the first object identifying the first material and the pixel labels for the other corresponding pixels of the second object identifying the second material.

20. The computer system of claim 19, wherein the training image is generated using a procedural generation model, and wherein the first object is assigned the first material and the second object is assigned the second material by the procedural generation model.

\* \* \* \* \*